US006209198B1

(12) United States Patent
Lammas et al.

(10) Patent No.: US 6,209,198 B1
(45) Date of Patent: Apr. 3, 2001

(54) METHOD OF ASSEMBLING A VARIABLE STATOR VANE ASSEMBLY

(75) Inventors: Andrew J. Lammas, Maineville; Wayne R. Bowen, West Chester, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/213,403

(22) Filed: Dec. 16, 1998

(51) Int. Cl.[7] ........ B23P 15/00
(52) U.S. Cl. ........ 29/889.22; 29/889.23
(58) Field of Search ........ 29/889.22, 889.23, 29/889.21

(56) References Cited

U.S. PATENT DOCUMENTS 5,328,327 * 7/1994 Naudet ........ 29/889.22
5,507,617 * 4/1996 Sun ........ 29/889.23
5,509,780 * 4/1996 Synfelt ........ 415/174.1
5,564,897 * 10/1996 Mansson ........ 29/889.22
5,690,469 * 11/1997 Deal et al. ........ 29/889.22

* cited by examiner

*Primary Examiner*—I Cuda
(74) *Attorney, Agent, or Firm*—Andrew C. Hess; Nathan D. Herkamp

(57) ABSTRACT

A method and fixture assembly for assisting in the matching and assembly of components of a variable stator vane assembly of a gas turbine engine. The method generally entails a stator vane configured to be assembled to a casing with a spacer. The vane has a surface at a perimeter thereof and a seat offset from the surface. The spacer to which the vane is to be assembled has first and second surfaces offset relative to each other, the first surface being adapted to engage the seat of the vane and the second surface adapted to face the surface of the vane. The vane is installed within an opening in the casing so that a first sealing member is between the casing and the vane, the casing is between the first sealing member and a second sealing member, and the seat extends through the opening. A fixture is then mounted to the vane so that the casing and the first and second sealing members are clamped between the fixture and the vane under a load. The position of the seat of the vane is then detected, and a spacer is selected having an offset dimension between its first and second surfaces based on the position of the seat.

11 Claims, 2 Drawing Sheets

METHOD OF ASSEMBLING A VARIABLE STATOR VANE ASSEMBLY

FIELD OF THE INVENTION

The present invention relates to assembly methods and fixtures therefor. More particularly, this invention relates to a fixture and method for assembling a variable stator vane assembly of a gas turbine engine, by which components of the vane assembly can be selected to compensate for part variances and thereby optimize the operation and service life of the assembly.

BACKGROUND OF THE INVENTION

Conventional gas turbine engines generally operate on the principle of compressing air within a compressor section of the engine, and then delivering the compressed air to the combustion section of the engine where fuel is added to the air and ignited. Afterwards, the resulting combustion mixture is delivered to the turbine section of the engine, where a portion of the energy generated by the combustion process is extracted by a turbine to drive the engine compressor. In turbofan engines having multistage compressors, stator vanes are placed at the entrance and exit of the compressor section and between adjacent compressor stages in order to direct the air flow to each successive compressor stage. Variable stator vanes, whose pitch can be adjusted relative to the axis of the compressor, are able to enhance engine performance by altering the air flow through the compressor section in response to the changing requirements of the gas turbine engine.

A high pressure compressor variable stator vane assembly 10 is shown in FIGS. 1 and 2. The assembly 10 includes a stator vane 12 mounted within an opening 38 in a casing 22 of a gas turbine engine. As known in the art, in order to alter the pitch of the vane airfoil relative to the axis of the compressor, the stator vane 12 is designed to rotate within the opening 38 of the casing 22. While various configurations are possible for variable stator vane assemblies, the vane 12 shown in FIGS. 1 and 2 has a radially extending flange 30 from which an annular-shaped portion extends axially to define a pair of seats 28 (unless otherwise noted, radial and axial directions referred to are with reference to the centerline of the vane assembly 10, and not the radial and axial directions of the engine in which the assembly 10 will be installed). A trunnion 34 also extends axially relative to the flange 30, and with the seats 28 projects through the opening 38 as seen in FIG. 2. The vane 12 is secured to the casing 22 with a nut 20 that also secures a spacer 14, sleeve 16 and lever arm 18 to the trunnion 34. Rotation of the vane 12 within the opening 38 is caused by actuation hardware (not shown) attached to the lever arm 18.

During engine operation, an overturning moment is created by the gas loads on the vane airfoil, generating reaction forces represented by the arrows "F" in FIG. 2. As a result, rotation of the vane 12 relative to the casing 22 requires a seal assembly that minimizes wear, friction, and compressor air leakage while subjected to the reaction forces F, as well as withstands the hostile thermal and chemical environment of a gas turbine engine. In FIGS. 1 and 2, a seal assembly is shown as consisting of a bushing 24 and washer 26 between the spacer 14 and flange 30 on opposite sides of the casing 22. The bushing 24 and washer 26 are preferably molded from composite materials, such as polyimide resin with glass and TEFLON® fibers, in order to be environmentally compatible with the engine environment, as well as provide suitable low-friction bearing surfaces that enable the vane 12 to rotate at acceptable torque levels.

The ability to minimize radial air leakage from the compressor through the opening 38 of the casing 22 is an important function of the bushing 24 and washer 26. As can be appreciated from FIG. 2, the dual functions of the bushing 24 and washer 26 to form an air seal yet enable rotation of the vane 12 are determined by the clearance (radial relative to the axis of the compressor) through the bushing 24 and washer 26 between the flange 30 of the vane 12 and an outer annular surface 36 of the spacer 14. To minimize compressor air leakage, the vane 12 and spacer 14 must be assembled to the casing 22 so that the minimum possible clearance is achieved. However, an excessively small clearance results in high forces being required to turn the vane 12, which can overstress the actuation hardware and, in the extreme situation, could completely prevent actuation of the vane 12, leading to compressor stall. On the other hand, an excessive clearance will not only permit excessive air leakage from the compressor, but will also permit the reaction forces on the vane 12 to cause excessive tilting of the vane assembly 10. If this occurs, the reaction forces F are more concentrated in the bushing 24 and washer 26 and, in combination with higher leakage through the seal assembly, causes more rapid deterioration of the bushing 24 and washer 26.

From FIG. 2, it can be seen that the clearance through the bushing 24 and washer 26 is determined by the axial offset dimension "D" between the annular surface 36 and a pair of shoulder 32 of the spacer 14. When the vane 12 and spacer 14 are properly assembled, each of the shoulders 32 abuts one of the seats 28 of the vane 12 as shown in FIG. 2. Increasing the offset dimension D reduces the clearance through the vane 12 and spacer 14 but increases the actuation torque required to rotate the vane 12, while decreasing the offset dimensions D increases the clearance but decreases the actuation torque.

In the art, variable stator vane assemblies of the type shown in FIGS. 1 and 2 have been assembled to attain a torque level within an acceptable range for the actuation hardware. Because it has been assumed that a close relationship exists between the offset dimension D and the torque required to rotate the vane 12, spacers 14 with incrementally different offset dimensions D have been purposely manufactured to allow adjustment of both the actuation torque and radial clearance by substituting spacers 14. After assembly, if the torque required to rotate a vane is outside preestablished torque limits, the nut 20, lever arm 18, sleeve 16 and spacer 14 are removed and the spacer 14 replaced with another having a different offset dimension D. For example, if the actuation torque was too high, a spacer 14 with a smaller offset dimension D was installed, while a spacer 14 with a greater offset dimension D is installed if an unacceptably low torque is measured. Once reassembled, torque is again remeasured and the process repeated if the torque remains outside the established limits.

Notwithstanding the above, further investigations have shown that the torque required to rotate the stator 12 is surprisingly relatively independent of the spacer 14 installed, and that torque is not a reliable indication of the radial clearance between the vane 12, spacer 14 and casing 22. Instead, actuation torque has been found to be primarily determined by irregularities and interferences of the bushing 24 and washer 26 after they have been compressed by the load generated between the flange 30 and spacer 14 by the nut 20. These irregularities and interferences are not predictable particularly since, while molded to tight tolerances, the composite bushing 24 and washer 26 can distort in the free state due to residual stresses, etc.

In view of the above, it can be seen that it would be desirable if a method were available for assembling a variable vane stator assembly to more consistently achieve minimum radial clearances without exceeding acceptable actuation torque levels.

BRIEF SUMMARY OF THE INVENTION

According to the present invention, there is provided a method and fixture assembly for assisting in the matching of components of a variable stator vane assembly of a gas turbine engine. In particular, components of the vane assembly are matched so that part variances are compensated for to minimize radial clearance while also achieving acceptable actuation torque levels, with the result that the operation and service life of the assembly are optimized.

According to this invention, the method of this invention generally entails a variable stator vane assembly that includes a stator vane configured to be assembled to a casing with a spacer. The vane has a seat offset from a surface. The spacer to which the vane is to be assembled has first and second surfaces offset relative to each other, the first surface being adapted to engage the seat of the vane, while the second surface is adapted to face the surface of the vane. The vane is installed within an opening in a casing so that a first sealing member is between the casing and the surface of the vane, the casing is between the first sealing member and a second sealing member, and the seat extends through the opening. According to this invention, a fixture is then mounted to the vane so that the casing and the first and second sealing members are clamped between the fixture and the vane under a predetermined load, which can be determined experimentally as the load required to flatten the sealing members and imperfections in their surfaces. The fixture preferably includes a tool body having an annular-shaped surface corresponding to the second surface of the spacer, and is mounted to the vane so that it generates the desired clamping load on the vane and sealing members. Finally, the position of the seat of the vane is detected and a spacer is selected having an offset dimension between its first and second surfaces based on the position of the seat.

In view of the above, it can be seen that an appropriate spacer is selected for the vane based on conditions corresponding to what will exist in the final assembly when properly installed. More particularly, the seal assembly composed of the sealing members is compressed under a load that flattens the sealing members and minor surface irregularities that would otherwise create drag torque when the spacer is mounted to the vane. In this condition, the offset dimension required for the spacer to provide the desired radial clearance through the seal assembly can be more accurately determined, with the result that repeated assembly and disassembly of the vane assembly is unnecessary. Accordingly, a significant advantage of this invention is that an improved assembly method is provided that significantly reduces the time to assemble a variable stator vane assembly, and simultaneously more accurately and consistently achieves a vane assembly whose radial clearance is minimized for an acceptable actuation torque level.

Other objects and advantages of this invention will be better appreciated from the following detailed description.

DETAILED DESCRIPTION OF THE INVENTION

Figure 1:
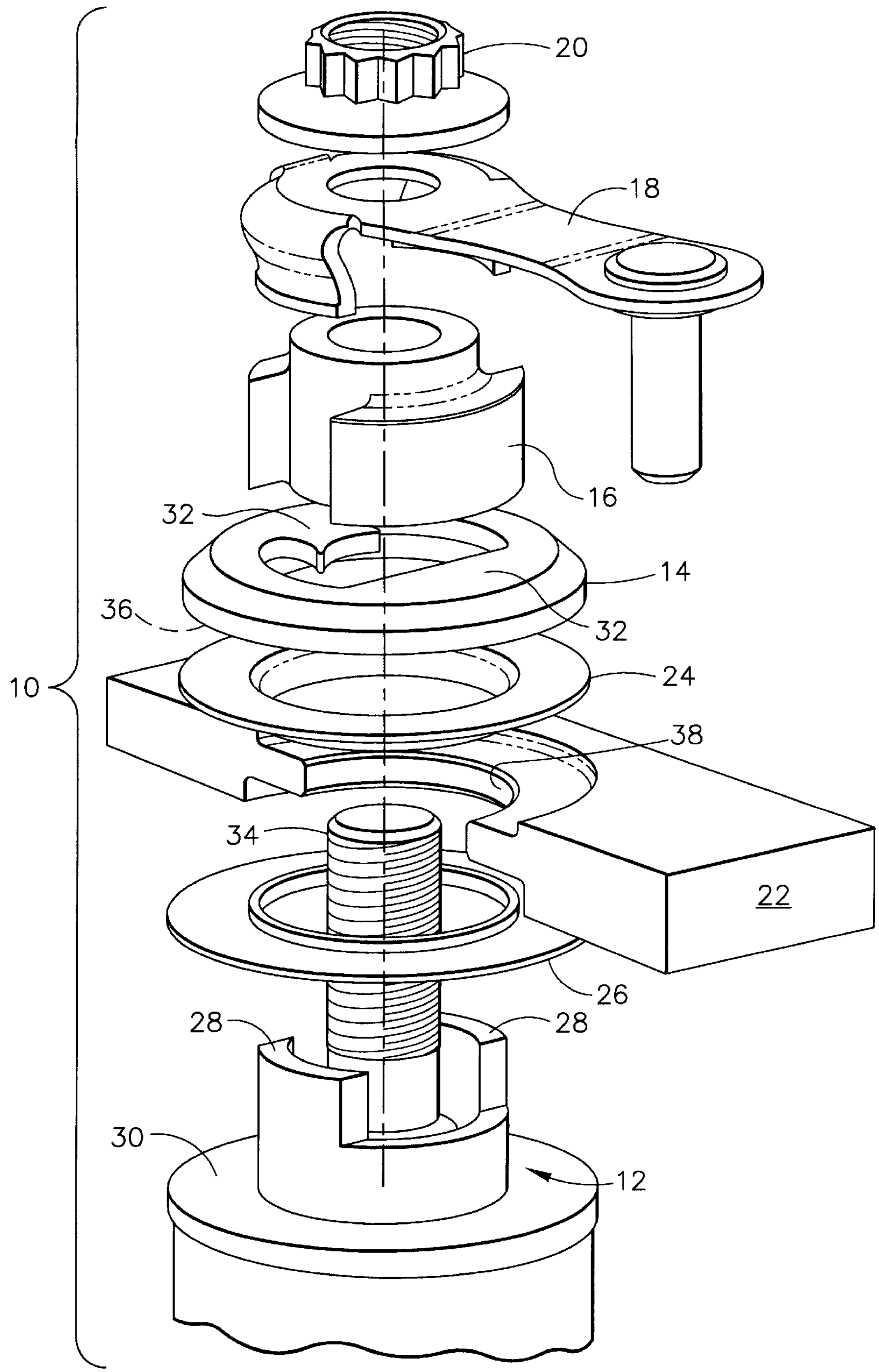
FIG. 1 is an exploded perspective view of a variable stator vane assembly for a gas turbine engine.
Figure 2:
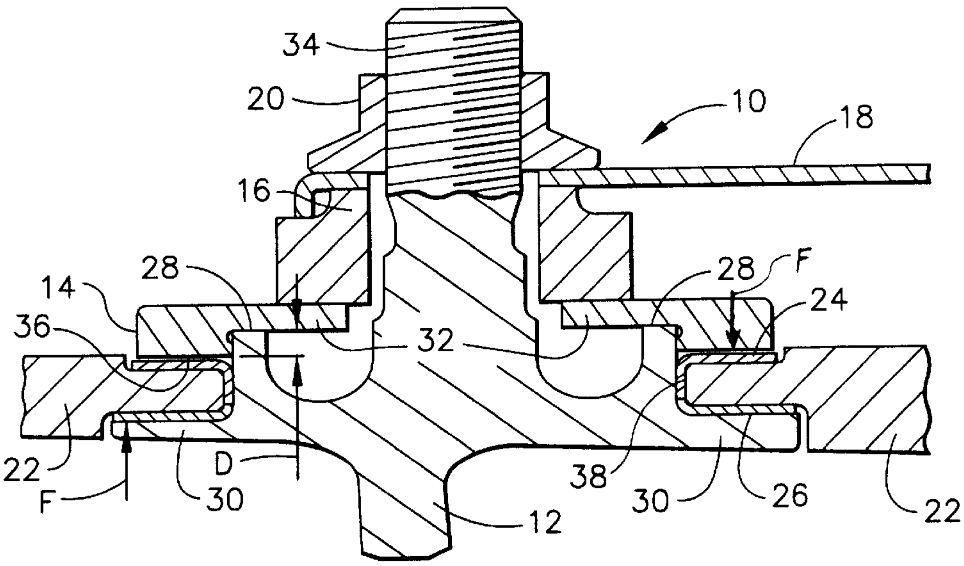
FIG. 2 is a cross-sectional view of the vane assembly of FIG. 1.
Figure 3:
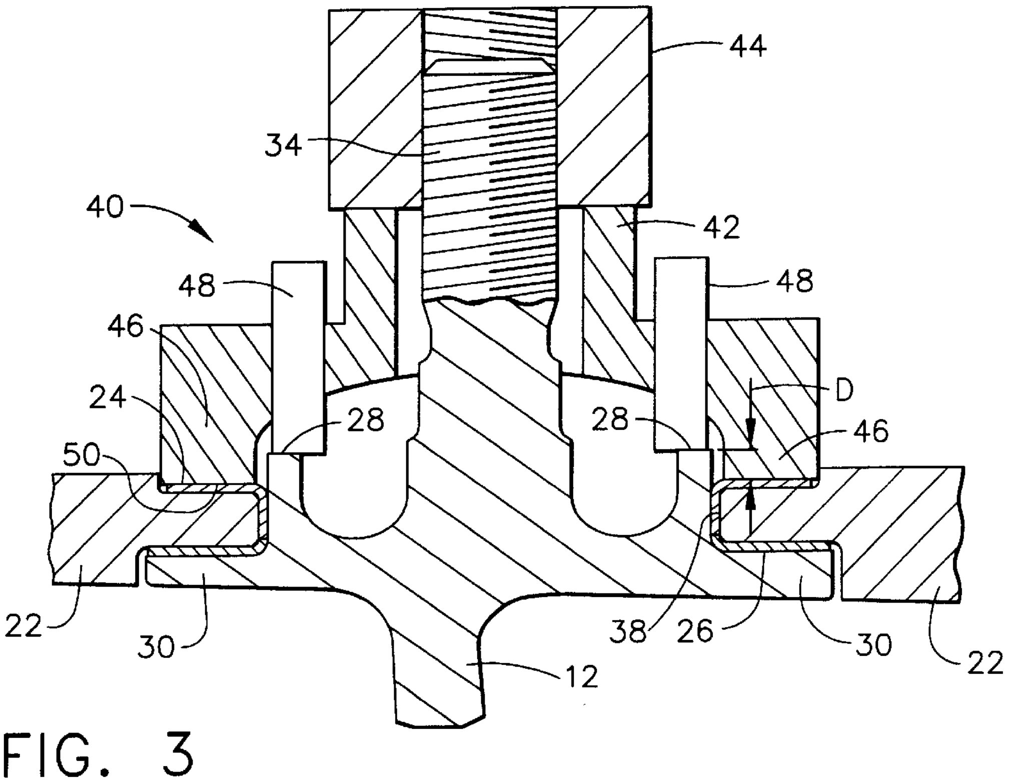
FIG. 3 is a cross-sectional view of a fixtured vane assembly in accordance with this invention.

The present invention provides a method and fixturing for assembling a variable stator vane assembly for use in a gas turbine engine. As represented in FIG. 3, the method entails preassembling a vane assembly of the general type shown in FIGS. 1 and 2 with a fixture 40, which enables the vane assembly to be more accurately, quickly and repeatably assembled while achieving minimal air leakage and acceptable actuation torque levels. While the invention will be described with reference to the vane assembly 10 of FIGS. 1 and 2, those skilled in the art will appreciate that the invention is applicable to vane assemblies that differ from that shown.

As described previously with reference to FIGS. 1 and 2, the variable stator vane assembly 10 includes the stator vane 12 rotatably mounted within the opening 38 in the casing 22 of a gas turbine engine, with the seats 28 and trunnion 34 extending axially relative to the flange 30 and through the opening 38. The vane 12, spacer 14, sleeve 16 and lever arm 18 are all secured to the trunnion 34 with the nut 20. The seal assembly that reduces leakage through the vane/spacer interface includes the bushing 24 and washer 26, which may be formed of a variety of materials, preferably composites such as polyimide resin with glass and TEFLON® fibers. While a two-piece seal assembly is shown, different seal assembly configurations and designs can be used with this invention.

The radial clearance between the casing 22, the flange 30 of the vane 12, and the annular surface 36 of the spacer 14 is determined by the axial offset dimension "D" between the annular surface 36 and the shoulders 32 on the spacer 14. Therefore, the determination of an optimal offset dimension D is critical to minimizing air leakage through the assembly 10 while maintaining an acceptable torque level required to rotate the vane 12. However, due to tolerance stacks and by design intent, the bushing 24 and washer 26 can have interferences with the vane 12, spacer 14 and casing 22, making a prediction of the radial clearance through the assembly 10 impossible.

According to this invention, the fixture 40 serves to determine the optimal offset dimension D under a specified clamping load for the spacer 14 based on the actual dimensions of the vane 12, casing 22, bushing 24 and washer 26, as well as the unpredictable irregularities and interferences between these components that determine the interrelationship between the radial clearance and actuation torque. As represented in FIG. 3, the fixture 40 includes a tool body 42 that is mounted to the vane 12 and casing 22 in lieu of the spacer 14, sleeve 16 and lever arm 18 shown in FIGS. 1 and 2. An annular-shaped portion 46 of the tool body 42 contacts the bushing 24 and therefore provides an annular-shaped abutment surface 50 that substitutes for the annular-shaped surface 36 of the spacer 14. The fixture 40 also includes a nut 44 that replaces the nut 20 of FIGS. 1 and 2, and threads onto the trunnion 34 as would the nut 20. The bushing 24 and washer 26 are assembled with the vane 12 and casing 22 as they would be for the assembly 10 shown in FIGS. 1 and 2. According to the invention, the nut 44 is tightened onto the trunnion 34 to attain a clamping load on the bushing 24 and washer 26 that is sufficient to flatten the bushing 24 and washer 26 and any imperfections in their surfaces, such that a more accurate measurement can be obtained for the offset dimension D required of the spacer 14.

As represented in FIG. 3, the fixture assembly 40 includes a pair of probes 48 that extend through the wall of the tool body 42 and into a cavity within the body 42. The probes 48, which can be of any suitable type, such as a linear variable displacement transducer (LVDT), capacitance probe, laser, etc., are used to detect the location of the seats 28 within the cavity. For example, if the locations of the probes 48 relative to the annular-shaped surface 50 of the tool body 42 are known, the location of the seats 28 can be accurately determined relative to the surface 50 or relative to the bushing 24 while subjected to the clamping load. With the location of the seats 28 known, the fixture assembly 40 can be removed and a spacer 14 selected and installed having an offset dimension D that will produce the desired radial clearance for the vane assembly 10. The load applied to the bushing 24 and washer 26 by the spacer 14 will be less than that applied through the fixture assembly 40, yet will achieve a desirable minimal radial clearance through the bushing 24 and washer 26 to minimize air leakage through the vane assembly 10.

While the invention has been described in terms of a preferred embodiment, it is apparent that other forms could be adopted by one skilled in the art. For example, though a nut 44 is shown as being employed to apply the clamping load through the fixture assembly 40, it is foreseeable that the clamping load could be generated by other means, such as with hydraulic, pneumatic and other mechanical equipment. Furthermore, the physical configuration of the vane assembly 10 and fixture assembly 40 could vary considerably from that shown in the Figures. Therefore, the scope of the invention is to be limited only by the following claims.

What is claimed is:

1. A method comprising the steps of:

providing a variable stator vane for a gas turbine engine, the vane having a surface and a seat offset from the surface, the vane being configured to be assembled with a spacer having first and second surfaces offset relative to each other, the spacer and the vane being configured such that, when the spacer is assembled to the vane, the first surface of the spacer engages the seat of the vane and the second surface of the spacer faces the surface of the vane;

installing the vane within an opening in a casing so that a first sealing means is between the casing and the surface of the vane, the casing is between the first sealing means and a second sealing means, and the seat extends through the opening;

mounting a fixture to the vane so that the casing and the first and second sealing means are clamped between a surface of the fixture and the surface of the vane under a clamping load;

detecting a position of the seat of the vane; and then selecting a spacer having an offset dimension between the first and second surfaces thereof based on the position of the seat.

2. A method as recited in claim 1, wherein the position of the seat of the vane is detected relative to the surface of the fixture.

3. A method as recited in claim 1, wherein the offset dimension of the spacer is approximately equal to a distance between the seat and the surface of the fixture.

4. A method as recited in claim 1, wherein the offset dimension of the spacer is such that the spacer applies a load to the first and second sealing means that is less than the clamping load applied by the fixture.

5. A method as recited in claim 1, wherein the vane further has a trunnion that extends through the opening in the casing when the vane is installed in the opening, and wherein the clamping load is applied by a fastener threaded onto the trunnion.

6. A method as recited in claim 1, further comprising the step of assembling the spacer to the vane so that the first surface of the spacer is engaged with the seat of the vane and the second surface of the spacer is engaged with the second sealing means.

7. A method as recited in claim 6, wherein the vane further has a trunnion that extends through the opening in the casing when the vane is installed in the opening.

8. A method as recited in claim 7, wherein the clamping load is applied by a fastener threaded onto the trunnion.

9. A method as recited in claim 7, further comprising the step of threading a nut onto the trunnion of the vane so as to engage the second surface of the spacer with the second sealing means.

10. A method as recited in claim 1, wherein the vane has multiple seats offset from the surface, each of the seats extends through the opening in the casing when the vane is installed within the opening, and the position of each of the seats is detected during the detecting step.

11. A method comprising the steps of:

providing a variable stator vane for a gas turbine engine, the vane having an axis, a flange at a radial perimeter thereof, multiple seats axially offset relative to the flange, and an axially-extending trunnion;

installing the vane within an opening in a casing so that a first sealing means is between the casing and the flange of the vane, the casing is between the first sealing means and a second sealing means, and the trunnion and at least two of the seats extend through the opening;

mounting a fixture to the vane so that the casing and the first and second sealing means are clamped between the fixture and the flange of the vane under a clamping load applied through the trunnion;

detecting relative to the second sealing means positions of the two seats extending through the opening of the casing;

removing the fixture;

based on the positions of the two seats, selecting a spacer having an offset dimension between first and second surfaces thereof; and then assembling the spacer to the vane so that the first surface of the spacer is engaged with at least one of the seats of the vane and the second surface of the spacer is engaged with the second sealing mean, the offset dimension of the spacer being such that the spacer applies a load to the first and second sealing means that is less than the clamping load applied by the fixture.

* * * * *